United States Patent [19]

Takeda et al.

[11] Patent Number: 4,641,957

[45] Date of Patent: Feb. 10, 1987

[54] OPTICAL MEMBER DRIVE SYSTEM FOR COPYING MACHINE

[75] Inventors: Katsuhiko Takeda; Masamichi Sugiura, both of Toyokawa, Japan

[73] Assignee: Minolta Camera Kabushiki Kaisha, Osaka, Japan

[21] Appl. No.: 848,683

[22] Filed: Apr. 4, 1986

Related U.S. Application Data

[63] Continuation of Ser. No. 737,821, May 23, 1985, abandoned.

[30] Foreign Application Priority Data

May 25, 1984 [JP] Japan ................................ 59-107223

[51] Int. Cl.[4] ........................ G03B 27/36; G03B 27/38

[52] U.S. Cl. ........................................................ 355/58

[58] Field of Search ................ 355/8, 11, 57, 58, 14 R; 354/400; 350/429; 352/139, 140

[56] References Cited

U.S. PATENT DOCUMENTS

| | | | |
|---|---|---|---|
| 3,897,148 | 7/1975 | Ritchie et al. | 355/57 |
| 4,209,248 | 6/1980 | Gibson et al. | 355/8 |
| 4,243,311 | 1/1981 | Tohyama et al. | 355/8 |
| 4,323,308 | 4/1982 | Kitajima et al. | 355/57 |
| 4,332,461 | 6/1982 | Cail et al. | 355/14 R |
| 4,371,254 | 2/1983 | Beery | 355/8 |
| 4,397,544 | 8/1983 | Yajima et al. | 355/58 |
| 4,552,453 | 11/1985 | Iwamoto et al. | 355/57 |

FOREIGN PATENT DOCUMENTS

| | | |
|---|---|---|
| 5633670 | 8/1979 | Japan . |
| 56-150766 | 6/1981 | Japan . |

*Primary Examiner*—Richard A. Wintercorn

*Attorney, Agent, or Firm*—Price, Gess & Ubell

[57] ABSTRACT

An optical drive system for a copying machine or the like including a projector lens assembly movable along a predetermined path, which system comprises a drive unit for moving the lens assembly, a device for, when the lens assembly is moved along the predetermined path which is divided into a predetermined number of zones, setting a speed at any one of the zones to a value appropriate to the magnitude of a load acting on the drive unit, and a control for speed controlling the drive unit in accordance with the speed set by said setting device.

20 Claims, 22 Drawing Figures

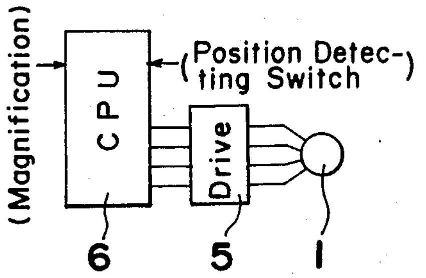
Fig. 3
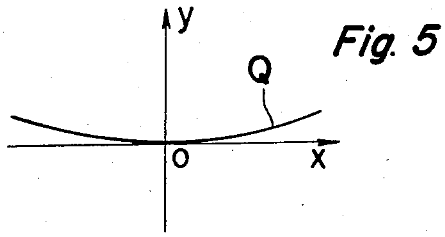
Fig. 5
Fig. 4
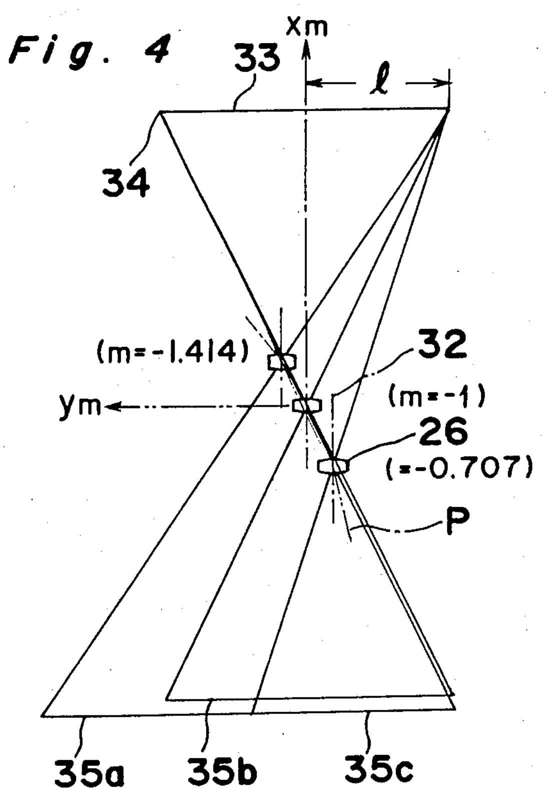
Fig. 7
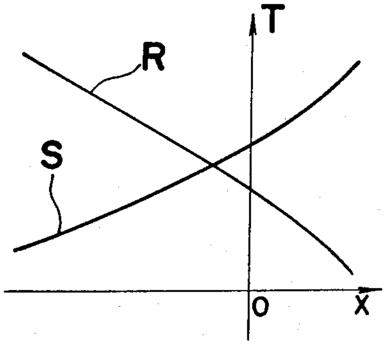
Fig. 6
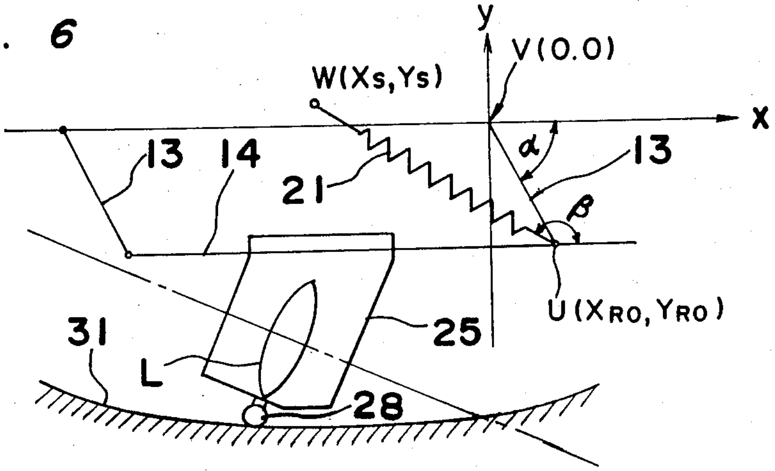

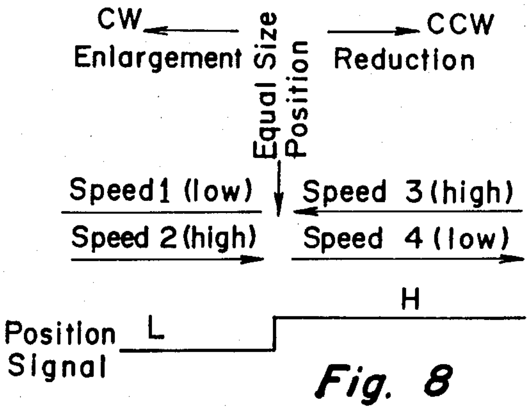
Fig. 8
Fig. 9
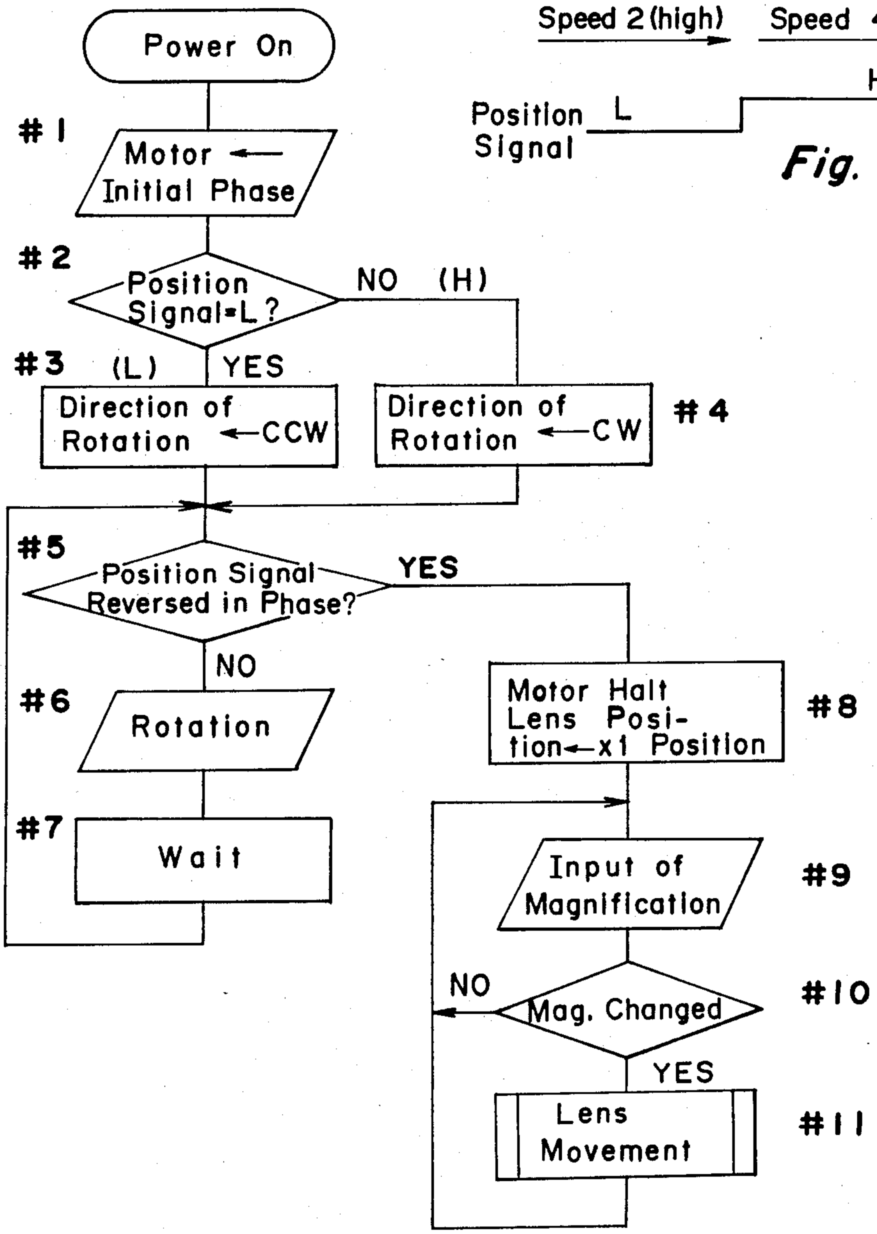

OPTICAL MEMBER DRIVE SYSTEM FOR COPYING MACHINE

This is a continuation of application Ser. No. 737,821, filed May 23, 1985, now abandoned.

BACKGROUND OF THE INVENTION

The present invention generally relates to a copying machine having a capability of reproducing an image at different magnifications one at a time and, more particularly, to an optical member drive system for the copying machine for repositioning the optical member according to the choice of one of the magnifications.

The term "magnification" hereinabove and hereinafter used is to be understood as interchangeable with a term "magnification ratio" and connotating, along with its literal meaning of "the state of being reproduced on an enlarged scale", both the state of being reproduced on a reduced scale and the equal size reproduction depending on a particular value taken by the ratio.

In the prior art copying machines of a type having a capability of reproducing an image at different magnifications one at a time, a drive motor for driving the objective lens assembly from one position to another according to the choice of one of the magnifications is liable to receive a varying load depending on the position of the lens assembly. More specifically, in the prior art copying machine employing a so-called corner-to-corner alignment method of document placement wherein any original or document desired to be copied is placed on a transparent original support with one corner thereof having been aligned with a reference corner of the original support regardless of the size of the original and the choice of magnifications, the lens assembly is driven by a stepper motor so as to move not only in a direction parallel to the optical axis of the lens assembly, but also in a direction laterally of the optical axis, when the magnification is changed, thereby to adjust the length of the optical path and the position of the optical axis which are appropriate to the newly chosen magnification. The movement of the lens assembly from one position to a new position necessitated by the change in magnification is guided by a magnification varying cam member having a curved guide so shaped and so curved that, while the lens assembly is laterally urged towards the cam member, the lens assembly can be driven by the stepper motor to move along a path conforming to the curved guide. Accordingly, the force loaded on the lens assembly varies depending on whether the direction of movement of the lens assembly lies in the direction in which the lens assembly approaches the curved guide or whether the direction of movement of the lens assembly lies in the direction in which the lens assembly leaves away from the curved guide. Specifically, the force acting on the lens assembly is smaller when the direction of movement of the lens assembly lies in the direction in which the lens assembly approaches the curved guide than when the same lies in the direction in which the lens assembly leaves away from the curved guide. In addition, the force acting on the lens assembly varies, too, depending on the position of the lens assembly. Therefore, the stepper motor is liable to receive a varying load.

Thus, in the prior art optical drive system hereinabove discussed, there is a problem in that, when the load imposed on the stepper motor is excessive, disorder may take place, and conversely, when the load on the lens assembly is too small, quivering may take place.

It is to be noted that the change in load on the stepper motor occurs not only in the copying machine employing the corner-to-corner alignment method of document placement discussed hereinabove, but also in the copying machine wherein, for example, the mirror adapted to be moved for changing the conjugate length is driven together with the lens assembly by a single and common motor.

SUMMARY OF THE INVENTION

The present invention has been developed with a view to substantially eliminating the above discussed problems inherent in the prior art optical member drive system and has for its essential object to provide an improved optical member drive system which is effective to minimize, or substantially eliminate, any possible disorder and any possible quivering which would occur when the load on the stepper motor is excessive and too small, respectively.

To this end, the present invention provides an improved optical member drive system wherein the speed of rotation of the stepper motor used for repositioning the lens assembly according to the choice of magnifications is adjusted to a high value at a low load, i.e., when the load on the stepper motor is too small, but to a low value at a high load or when the load on the stepper motor is excessive.

BRIEF DESCRIPTION OF THE DRAWINGS

This and other objects and features of the present invention will become clear from the following detailed description taken in conjunction with preferred embodiments thereof with reference to the accompanying drawings, in which:

FIG. 3 is a circuit block diagram showing a control for the system of FIG. 1;

FIG. 4 is an explanatory diagram showing the manner in which the lens assembly is shifted to change the magnification in a copying machine employing the corner-to-corner alignment method of document placement;

FIG. 5 is a diagram showing a curve of a cam plate, used in the embodiment of FIG. 1, extending along a horizontal plane;

FIG. 6 is a schematic representation of the optical drive system of FIG. 2;

FIG. 7 is a graph showing changes in load on a stepper motor by experiment;

FIG. 8 is an explanatory diagram showing the manner in which the stepper motor employed in the first embodiment is controlled;

FIGS. 9 and 10 are flow charts showing the sequence of control in the first embodiment of the present invention;

DETAILED DESCRIPTION OF THE EMBODIMENTS

Figure 1:
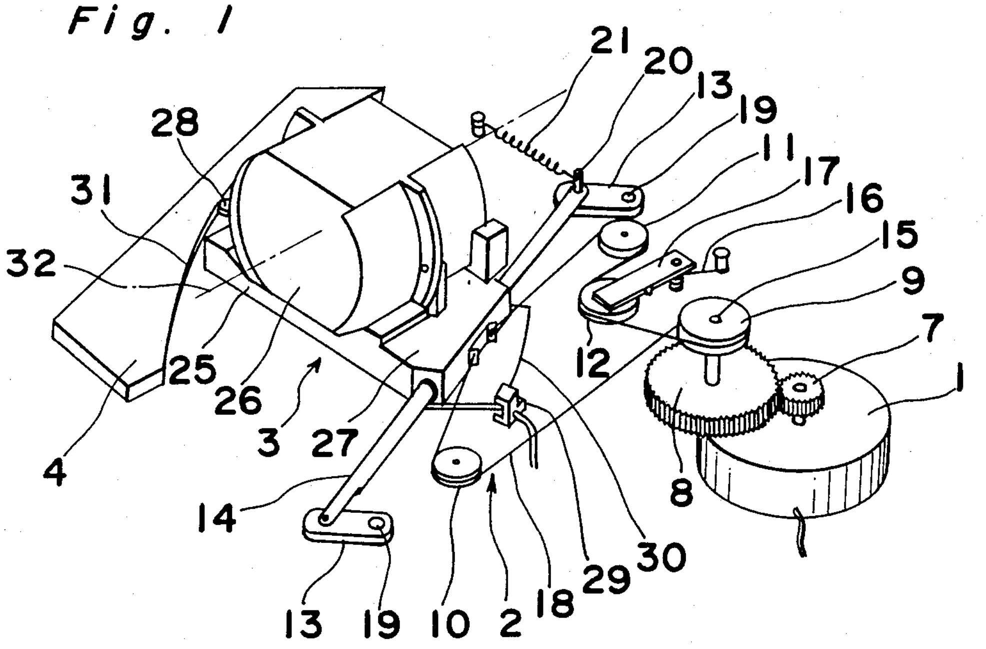
FIG. 1 is a schematic perspective view of an optical drive system according to a first embodiment of the present invention.

Before the description of the present invention proceeds, it is to be noted that like parts are designated by like reference numerals throughout the accompanying drawings.

Figure 2:
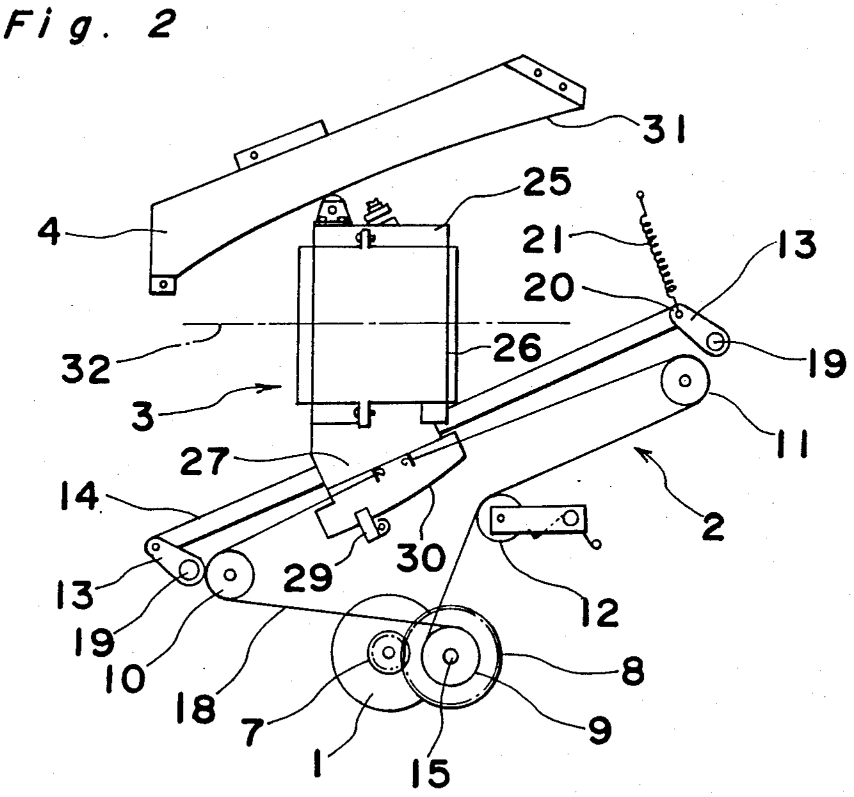
FIG. 2 is a schematic top plan view of the system of FIG. 1.

Referring first to FIGS. 1 and 2, an optical member drive system shown therein according to a first embodiment of the present invention comprises a stepper motor 1, a drive transmission mechanism 2, a lens unit 3 and a magnification varying cam plate 4 for use in a copying machine employing the corner-to-corner alignment method of document placement.

As shown in FIG. 3, the stepper motor 1 is electrically connected with, and is controlled by, a CPU 6 for the control of an optical member system through a drive circuit 5 so that the speed of rotation of the stepper motor 1 can be controlled.

The drive transmission mechanism 2 includes first and second gears 7 and 8, first, second and third fixed pulleys 9, 10 and 11, a movable pulley 12, a pair of spaced first links 13 and a second link 14. The first gear 7 is mounted on a drive shaft of the stepper motor 1 for rotation together therewith and is meshed with the second gear 8 which is rigidly mounted on a vertical shaft 15 together with the first fixed pulley 9, so that when the motor 1 is driven, the first fixed pulley 9 can be rotated. The second and third fixed pulleys 10 and 11 are rotatably supported by respective vertical shafts whereas the movable pulley 12 is rotatably mounted on a horizontally swinging arm 17 normally biased in one direction (clockwise as viewed in FIGS. 1 and 2) by a torsion spring 16. Around these pulleys 9, 10, 11 and 12, a length of cable 18 having its opposite ends fixed as will be described later is trained.

The first links 13 are pivotally mounted on respective vertical pivot pins 19 and have their free ends connected together by means of the second link 14 having its opposite ends pivotally coupled thereto. The first links 13, the pivot pins 19 and the second link 14 are so arranged and so positioned that the second link 14 can move while keeping a parallel relation to the imaginary line connecting the axes of the respective pivot pins 19 together. One of the respective pivotal joints between the first link 13 (the right-hand link as viewed in FIGS. 1 and 2) and the second link 14 and between the first link 13 (the left-hand link as viewed in FIGS. 1 and 2) and the second link 14, for example, the pivotal joint 20 between the right-hand link 13 and the link 14 is so connected with a coil spring 21 that the pivotal joint 20 can assume a position laterally away from the imaginary line connecting the axes of the respective pivot pins 19.

The lens unit 3 comprises a lens carriage 25 on which an objective lens assembly 26 is rigidly mounted. The lens carriage 25 has a bearing portion 27, in which the second link 14 is inserted so that the carriage 25 can slide along the second link 14, and carries a roller 28 at a portion thereof on one side of the lens assembly 26 opposite to the bearing portion 27, which roller 28 is constantly engaged with the cam member 4. The opposite ends of the length of cable 18 are rigidly connected exteriorly to the mount 27 of the lens carriage 25 so that, when the cable 18 is driven in one of the opposite directions incident to the rotation of the stepper motor 1, the lens carriage 25 can be moved in a direction parallel to the second link 14. The movable pulley 12 urged in said one direction by the torsion spring 16 serves to keep the cable 18 taut.

A position detecting member 29 comprised of a light emitting element and a photocell is disposed between the second and third fixed pulleys 10 and 11 and in the path of movement of an interceptor plate 30 which is rigidly secured from below to, or otherwise integrally formed with, the lens carriage 25 so as to extend laterally outwardly from the bearing portion 27. The position of the lens assembly can be detected when the interceptor plate 30 movable together with the lens carriage 25 traverses a gap between the light emitting element and the photocell forming the position detecting member 29.

The optical member drive system of the construction described above is suited for use in a copying machine employing the corner-to-corner alignment method of document placement in which the lens assembly is required to move not only in a direction parallel to the optical axis of the lens assembly, but also in a direction laterally of the optical axis when the magnification at which the original is copied on a copy paper is changed, as schematically shown in FIG. 4. In FIG. 4, reference numeral 33 represents an original or document placed on a transparent original support in the copying machine and having one of its four corners aligned in abutment with one of the four corners of the original support which is designated as a reference corner 34. Reference numerals 35*a*, 35*b* and 35*c* represent a photoreceptor surface, a copy paper (not shown) being fed over the photoreceptor surface with one side edge thereof aligned with the right-hand end of the photoreceptor surface as viewed in FIG. 4. The lens assembly is shown as positioned at an enlarged reproduction position at which the magnification is 1.414, an equal size reproduction position at which the magnification is 1, and a reduced reproduction position at which the magnification is 0.707, it being noted that the lens assembly can assume these positions one at a time. A double-dotted chain line P shown as passing through all of the positions for the lens assembly represents the path along which the lens assembly must move when the magnification is changed. This path P of movement of the lens assembly provides a profile to be taken by a curved cam face 31 of the cam plate 4 to which the roller 28 is rollingly engaged.

Assuming that the equal size reproduction position for the lens assembly is taken as the origin, and the direction of the optical axis and a direction perpendicular to the direction of the optical axis are respectively expressed by the axes of coordinates $x_m$ and $y_m$, the shape of the cam face 31 is:

$$x_m = \frac{m+1}{m} \cdot f$$

-continued $$y_m = \frac{m+1}{m-1} \cdot l$$

wherein m: magnification (negative value)

f: focal length l: image height

Let it be assumed that the imaginary line drawn to connect between the position at which the original can be reproduced at a maximum available magnification and the position at which the original can be reproduced at a minimum available magnification extend in a direction parallel to the second link 14, and the angle between the direction and the optical axis is expressed by $\theta$. If the values of $x_m$ and $y_m$ referred to above are converted into a system of coordinates (x, y) wherein the direction of extension of the second link 14 is taken in the axis of abscissa, the following equations can be obtained.

$$x = \frac{m+1}{m} f \cdot \cos\theta \, \frac{m+1}{m-1} \, l \cdot \sin\theta \qquad \text{(I)}$$

$$y = \frac{m+1}{m} f \cdot \sin\theta \, \frac{m+1}{m-1} \, l \cdot \cos\theta$$

The curve Q shown in FIG. 5 is given by equations (I) above.

The gradient dy/dx of the curve Q is expressed by the following equation.

$$\frac{dy}{dx} = -\frac{(m-1)^2 f\sin\theta - 2m^2 l\cos\theta}{(m-1)^2 f\cos\theta + 2m^2 l\sin\theta} \qquad \text{(II)}$$

Reference is now made to FIG. 6 which illustrates a schematic representation of what is shown in FIG. 2. In the (x, y) coordinate system discussed above, assuming that the origin represents the center V of pivot of any one of the first links 13, the angle formed between the first and second links 13 and 14 is expressed by $\alpha$, and the length of any one of the first links 13 is expressed by S, the coordinates ($X_{R0}$, $Y_{R0}$) of the point U which is the point of action for the first link 13 are as follows.

$$X_{R0} = S \cos \alpha$$

$$Y_{R0} = S \sin \alpha$$

On the other hand, since the coordinates ($X_R$, $Y_R$) of the point U at a magnification m are expressed as follows, $$X_R = \sqrt{S^2 - Y_R^2}$$

$$Y_R = y + Y_{RO}$$

they can also be expressed as follows using equations (I), with the magnification m taken as a parameter:

$$\left.\begin{aligned} X_R &= \sqrt{S^2 - \left(-\frac{m+1}{n1} f \cdot \sin\theta + \frac{m+1}{m-1} l\cos\theta + S\sin\alpha\right)^2} \\ Y_R &= -\frac{m+1}{m} f \cdot \sin\theta + \frac{m+1}{m-1} l\cos\theta + S\sin\alpha \end{aligned}\right\} \qquad \text{(III)}$$

If the spring 24 is expanded to a length Lso and laid between a fixing point W and the action point U at the equal size reproduction position while it has an angle $\beta$ oriented from the second link 14 around the action point U, the coordinates ($X_s$, $Y_s$) of the fixing point W of the spring 21 can be expressed as follows:

$$\left.\begin{aligned} X_s &= Lso \cdot \cos\beta + X_{RO} = Lso \cdot \cos\beta + S\cos\alpha \\ Y_s &= Lso \cdot \sin\beta + Y_{RO} = Lso \cdot \sin\beta + S\sin\alpha \end{aligned}\right\} \qquad \text{(IV)}$$

The length Ls of the spring 21 at the magnification m can be expressed by the following equation:

$$Ls = \sqrt{(X_R - X_S)^2 + (Y_R - Y_S)^2} \qquad \text{(V)}$$

The force F which the spring 21 brings about on the action point U is expressed by the following equation, wherein k represents a spring constant and $L_{SN}$ represents a natural length of the spring 21:

$$F = -K(LS - LSN) \qquad \text{(VI)}$$

and the distance R between the spring 21 and the center V of pivot of the first link 13 is expressed by the following equation:

$$R = \frac{X_R \cdot Y_S - X_S \cdot Y_R}{L_S} \qquad \text{(VII)}$$

The moment $M_S$ which the first link 13 receives from the spring 21 is expressed by $M_S = -F \cdot R$ and has the following relationship with the moment $M_L$ which the first link 13 receives from the second link 14, that is, which is transmitted to the first link 13 from the roller 28, regulated by the curved cam face 31, through the lens carriage 25 and then through the second link 14.

$$M_S + M_L = 0$$

The moment $M_L$ referred to above can be expressed by the following equation:

$$M_L = Ny \cdot X_R + \mu Ny Y_R$$

wherein Ny represents a component of the vertical reactive force acting from the cam face 31 onto the roller 28, which acts in a y-direction, and Nx represents another component of the same which acts in an x-direction, and $\mu$ represents a coefficient of friction between the lens carriage 25 and the second link 14.

From the foregoing three equations, it is clear that:

$$Ny = \frac{F \cdot R}{X_R + \mu Y_R} \qquad \text{(VIII)}$$

Based on the foregoing discussion, a force T acting to pull the lens carriage 25 in the x-direction, can be calculated as follows:

$$T = \mu Ny + Nx$$

$$= \left(\mu + \frac{dy}{dx}\right) Ny \left(\because Nx = \frac{dy}{dx} Ny\right)$$

The force T is nothing other than a load acting on the drive motor, and can also be expressed as follows when equations (V), (VI), (VII) and (VIII) are incorporated:

$$T = -K\left(1 - \frac{L_{SN}}{\sqrt{(X_R - X_S)^2 + (Y_R - Y_S)^2}}\right)(X_R Y_S - \qquad \text{(IX)}$$

$$X_S Y_R)(X_R + \mu Y_R)^{-1}\left(\mu + \frac{dy}{dx}\right) = -K\Bigg(\Bigg(1 -$$

$$L_{SN}\Bigg(\Bigg\{\Bigg(\sqrt{S^2 - \left(-\frac{m+1}{m} f\sin\theta + \frac{m+1}{m-1} l\cos\theta + S\sin\alpha\right)^2} -$$

$$L_{so}\cdot\cos\beta - S\cos\alpha\Bigg\}^2 + \Bigg(-\frac{m+1}{m} f\sin\theta + \frac{m+1}{m-1} l\cos\theta +$$

$$S\sin\alpha - L_{so}\cdot\sin\beta - S\sin\alpha\Bigg)^2\Bigg) - \frac{1}{2}\Bigg)\Bigg) \times$$

$$\Bigg\{\sqrt{S^2 - \left(-\frac{m+1}{m} f\sin\theta + \frac{m+1}{m-1} l\cos\theta + S\sin\alpha\right)^2}\,(L_{so}\cdot$$

$$\sin\beta + S\cdot\sin\alpha) - \Bigg(-\frac{m+1}{m} f\sin\theta + \frac{m+1}{m-1} l\cos\theta + S\cdot$$

$$\sin\alpha\Bigg)(L_{so}\cdot\cos\beta + S\cos\alpha)\Bigg\} \times$$

$$\Bigg\{\sqrt{S^2 - \left(-\frac{m+1}{m} f\sin\theta + \frac{m+1}{m-1} l\cos\theta + S\cdot\sin\alpha\right)^2} + \mu\Bigg(-$$

$$\frac{m+1}{m} f\sin\theta + \frac{m+1}{m-1} l\cos\theta + S\sin\alpha\Bigg)\Bigg\}^{-1} \times \Bigg\{\mu -$$

$$\frac{(m-1)^2 f\sin\theta - 2m^2 l\cos\theta}{(m-1)^2 f\cos\theta + 2m^2 l\sin\theta}\Bigg\}$$

From equation (IX), it will readily be seen that, given respective values for $\alpha$, $\beta$, $\theta$, S, R, $L_{SN}$, $L_{S0}$ and $\mu$, the load T can readily be fixed as a function of the magnification. When plotting in a graph by arbitrarily choosing particular values for the above parameters in equation (IX), the extent to which the load varies differs between the case in which the magnification is changed from enlargement to reduction and the case in which the magnification is changed from reduction to enlargement.

The foregoing description made with reference to the above equation is of general outline and does not accurately reflect the reality. Therefore, the graph based on the actual measurements done with the use of the structure of FIGS. 1 and 2 are as shown in FIG. 7. Referring to FIG. 7, a curve R represents a change in load T occurring when the lens assembly 26 is moved from the enlarged reproduction position towards the reduced reproduction position (from right towards left as viewed in FIG. 7) while a curve S represents a change in load T occurring when the lens assembly 26 is moved from the reduced reproduction position towards the enlarged reproduction position.

The stepper motor 1 is known as having such an operating characteristic that it gives a small torque when driven at a high speed, but a great torque when driven at a low speed. In view of this, in the system of the present invention, the position of the lens assembly 26 is made to be detected by a position detecting switch 29. More specifically, and in the instance shown in FIG. 8, the position detecting switch 29 is so positioned and so arranged as to generate a high level signal "H" when the lens assembly 26 moves from the equal size reproduction position x=0 in a direction rightwards, that is, in a reducing direction CCW towards the reduced reproduction position, but a low level signal "L" when the lens assembly moves from the equal size reproduction position in a direction leftwards, that is, in an enlarging direction CW towards the enlarged reproduction position. The equal size reproduction position (X=0) is taken as a position at which the stepper motor 1 is switched from a high speed drive to a low speed drive so that the motor 1 can drive at the high speed and the low speed respectively when the load on the motor 1 is low and high. In other words, as shown in FIG. 8, the speed of the motor is switched from a high speed (speed 3) to a low speed (speed 1) when the lens assembly moves towards the enlarged reproduction position, but from a high speed (speed 2) to a low speed (speed 4) when the lens assembly moves towards the reduced reproduction position.

To this end, the stepper motor 1 is controlled in a manner which will now be described with particular reference to FIGS. 9 and 10.

Referring first to FIG. 9, assuming that the supply of an electrical power to the copying machine has been initiated, the following sequential steps are progressively performed to return the lens assembly to the equal size reproduction position, that is, the position corresponding to the position at which the motor 1 is switched from the high speed drive to the low speed drive.

At step #1, the stepper motor 1 is set to an initial phase in readiness of the subsequent rotation. At the subsequent step #2, by the position signal from the position detecting switch 29, it is determined where the lens assembly 26 presently occupies relative to the equal size reproduction position (x=0). As hereinbefore described, the position detecting switch 29 generates the low level signal "L" when the lens assembly 26 is positioned at any point between the equal size reproduction position and the enlarged reproduction position, but the high level signal when the lens assembly 26 is positioned at any point between the equal size reproduction position and the reduced reproduction position. In the event that the switch 29 has generated the low level signal "L", step #2 is followed by step #3 at which the motor 1 is set to rotate in a direction required to move the lens assembly 26 in the reducing direction CCW, but in the event that the switch 29 has generated the high level signal "H", step #2 is followed by step #4 at which the motor 1 is set to rotate in the opposite direction required to move the lens assembly 26 in the enlarging direction CW.

At step #5, a decision is made to determine if the level of the signal from the switch 29 has been reversed. If the result of decision at step #5 indicates that the signal level has not been reversed, the program flow proceeds to step #6, but if it indicates that the signal level has been reversed, the program flow proceeds to step #8.

At step #6, the stepper motor 1 is rotated a pitch and, after a length of time during which the stepper motor 1 is rotated has been allowed to pass at step #7, the program flow returns to step #5.

On the other hand, at step #8, the motor 1 is brought to a halt and data representative of the equal size reproduction position is set in a register. This data is based upon a data at the minimum available magnification and is used for the determination of the distance of movement of the lens assembly at the time the lens assembly is moved. At the subsequent step #9, the choice of magnification is carried out, followed by a decision step #10 at which a decision is made to determine if the magnification has been changed. If the result of a decision at step #10 indicates that the magnification has not been changed, the program flow returns to step #9, but if it indicates that, while no change occurs in position of the lens assembly 26, the magnification has been changed, the program flow proceeds to step #11 at which a subroutine necessary to move the lens assembly as shown in FIG. 10 is executed.

Figure 10:
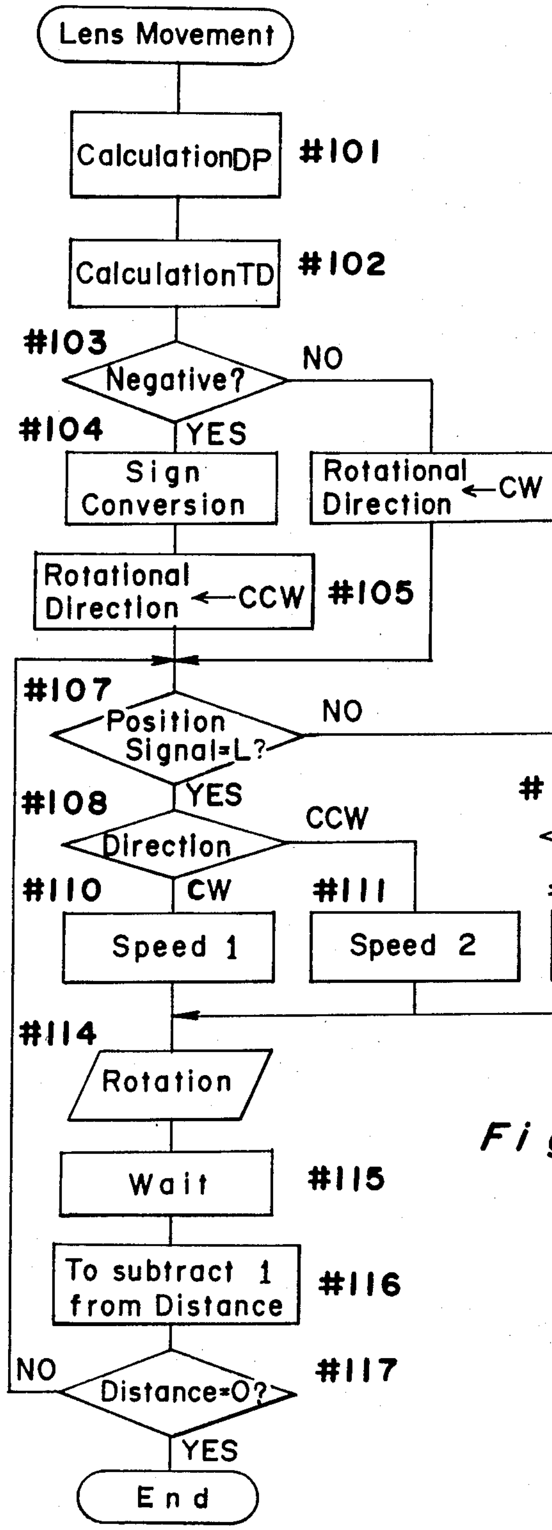

Referring to FIG. 10, and at step #101, calculation is carried out to determine the position DP for the lens assembly appropriate to the chosen magnification. At the subsequent step #102, the difference is calculated between the current position assumed by the lens assembly and the new position for the lens assembly appropriate to the chosen magnification to determine the distance over which the lens assembly 26 has to be moved, which difference is hereinafter referred to as a "total distance TD".

By way of example, the following data descriptive of various positions x for the lens assembly appropriate to arbitrarily chosen magnifications m relative to the position for the lens assembly assumed at the minimum available magnification are previously memorized in the interior memory of the CPU 6.

| m | x |
|---|---|
| 0.640 | 0 |
| 0.900 | 450 |
| 1.000 | 500 |
| 1.420 | 800 |

Let it be assumed that the magnification m=0.900 is inputed. In this case, the difference is determined between the values 450 and 500, which difference, that is, −50, represents the distance over which the lens assembly has to be moved for it to reach the position appropriate to the choice of magnification m=0.900. It is to be noted that the direction in which the lens assembly has to be moved is determined whether the difference calculated at step #102 takes a negative value (signifying the reducing direction) or whether it takes a positive value (signifying the enlarging direction). It is the subsequent step #103 at which such determination is made.

In the specified example wherein the difference is −50 as discussed above signifying that the lens assembly has to be moved in the reducing direction, the negative value is converted into a positive value at step #104 to give the distance over which the lens assembly has to be moved, followed by step #105 at which the stepper motor 1 is set to rotate in one of the opposite directions required to move the lens assembly in the reducing direction CCW. On the other hand, if the difference calculated at step #102 has taken a positive value signifying that the lens assembly has to be moved in the enlarging direction, step #103 is followed by step #106 at which the stepper motor 1 is set to rotate in the other of the opposite direction required to move the lens assembly in the enlarging direction CW.

At step #107, a decision is made to determine whether the signal fed from the position detecting switch 29 is in a high level state or whether it is in a low level state. If the signal is in the low level state, that is, when it is found that the lens assembly 26 is positioned on one side of the equal size reproduction position adjacent the enlarged reproduction position, the program flow proceeds to step #108, but if the signal is in the high level state, that is, when it is found that the lens assembly is positioned on the other side of the equal size reproduction position adjacent the reduced reproduction position, the program flow proceeds to step #109.

At steps #108 and #109, a decision is made to confirm the direction for the stepper motor 1 to be rotated. If the direction for the motor 1 to be rotated conforms to the enlarging direction CW, steps #108 and #109 are followed by steps #110 and #112, respectively, but if the direction conforms to the reducing direction CCW, steps #108 and #109 are followed by steps #111 and #113, respectively.

At steps #110 to #113, the motor 1 is set to rotate at speed 1, speed 2, speed 3 and speed 4, respectively. In other words, once the distance over which the lens assembly has to be moved and the direction in which the motor has to be rotated have been determined, the speed at which the motor 1 has to rotate is determined in the light of the current position of the lens assembly 26 (represented by the level of the signal from the position detecting switch 29) and the direction in which the lens assembly 26 is to be moved.

In the embodiment now under discussion, arrangement has been made that, while the equal size reproduction position is taken as a position at which the stepper motor 1 is switched from a high speed drive to a low speed drive, the motor 1 can be rotated at the high speed and the low speed, respectively, when the load on the motor 1 is low and high, as described hereinbefore with particular reference to FIG. 8.

At step #114, the stepper motor 1 is rotated one pitch in phase at the speed determined as hereinbefore described. At the subsequent step #115, a length of time required for the motor 1 to complete the rotation is allowed to pass.

After the completion of rotation of the stepper motor 1 and at step #116, a value "1" is subtracted from the data of the distance over which the lens assembly is to be moved, the result of such subtraction represents the new distance over which the lens assembly has to be further moved. At step #117, a decision is made to determine whether or not the distance over which the lens assembly 26 is moved has become zero. If it is not zero, the program flow from step #107 to step #117 is repeated until the distance over which the assembly is to be moved becomes zero.

On the other hand, if the result of the decision at step #117 indicates that the distance in question has become zero signifying that the lens assembly 26 has been completely moved the required distance, the subroutine terminates and the program flow returns to step #9 shown in FIG. 9.

In this way, the lens assembly 26 has been moved to the position appropriate to the choice of one of the available magnifications at which the original has been desired to be reproduced on a copy paper.

Although in the foregoing embodiment the equal size reproduction position has been described as the position at which the speed of rotation of the stepper motor 1 is switched, the present invention may not be always limited thereto, but may be practiced by way of the following embodiment or embodiments.

Figure 11:
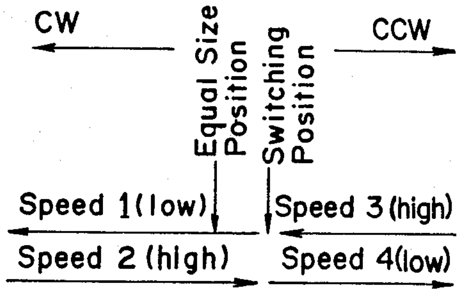
FIGS. 11, 13 and 15 are explanatory diagrams showing the manner in which the stepper motor is controlled according to second, third and fourth embodiments of the present invention, respectively.
Figure 12:
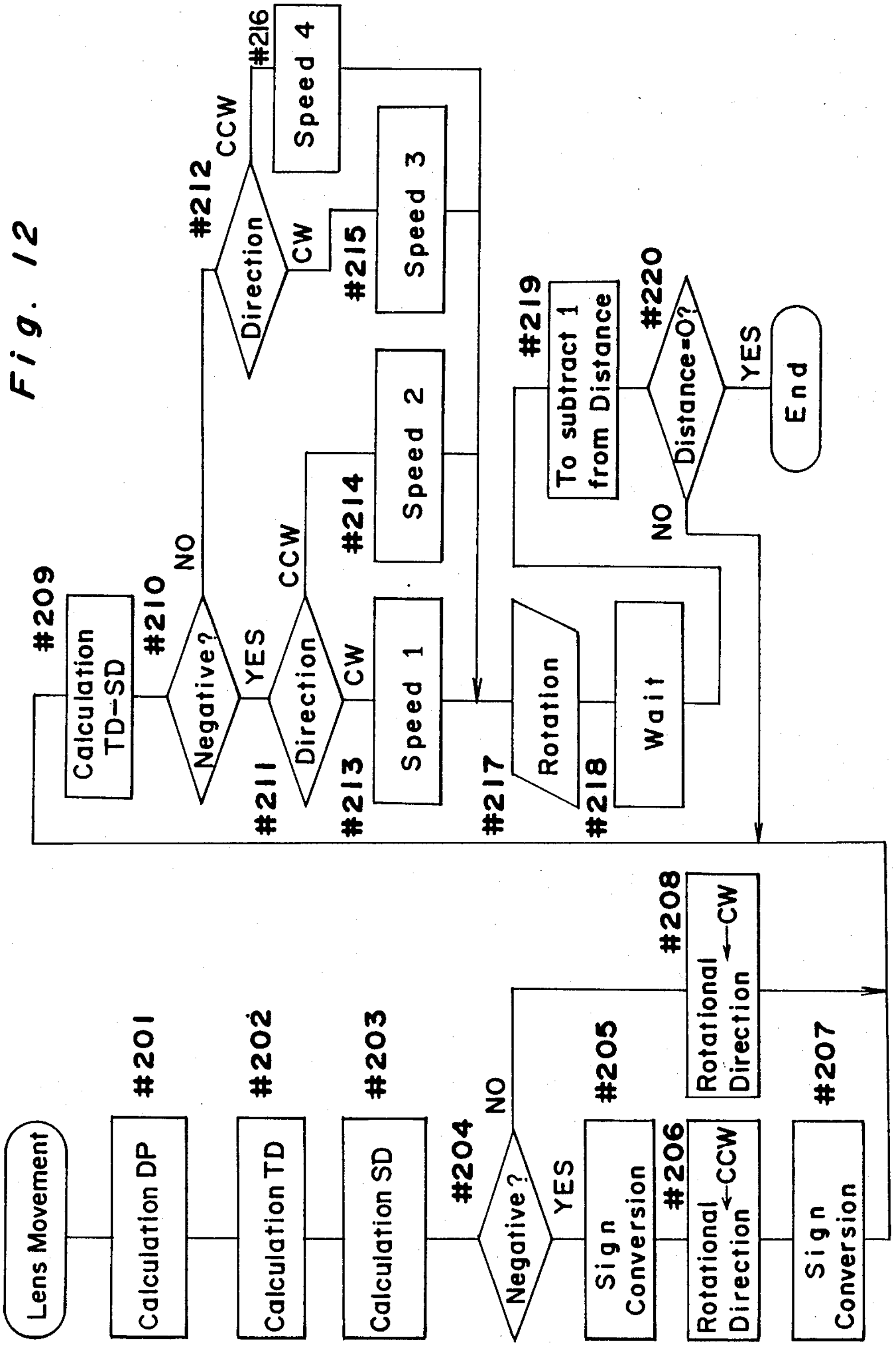
FIGS. 12, 14 and 16 are flow charts showing the sequence of control in the second, third and fourth embodiments of the present invention, respectively, it being to be noted that FIG. 16 is composed of FIGS. 16(*a*) and 16(*b*)

In the second embodiment of the present invention shown in FIGS. 11 and 12, the switching position, i.e., the position at which the speed of the stepper motor 1 is switched is set at a position of m=0.917 at which load curves R and S shown in the graph of FIG. 7 intersect. In this instance, a subroutine to be executed at step #11 shown in FIG. 9 is different from that shown in FIG. 10, as shown in FIG. 12. The subroutine shown in FIG. 12 is similar to that shown in FIG. 10 except for step #203 added after step #202, step #207 added after step #206 and steps #209 and #210 exchanged for step #107 of FIG. 10.

Referring to FIG. 12, the difference in distance between the position to which the lens assembly 26 is desired to be moved and the switching position, which difference is hereinafter referred to as "switching distance SD", is calculated at step #203, and there is calculated a difference after subtracting the switching distance SD from the total distance TD at step #209. At the subsequent step #210, it is determined whether the difference calculated at step #209 takes a negative value or a positive value. Thereafter, the speed at which the stepper motor 1 is to be rotated is determined in a manner similar to that according to the subroutine shown in FIG. 10. Then, each time the stepper motor 1 is rotated one pitch, the distance over which the lens assembly is to be moved is subtracted one step at step #219 in a manner similar to that according to the subroutine of FIG. 10 and, thereafter, the difference between the total distance TD and the switching distance SD is calculated and confirmed each time at steps #209 and #210, with the result that the speed at which the stepper motor 1 is rotated is selected.

It is to be noted that step #207 is provided for the conversion of a symbol of the switching distance necessitated by step #205 at which a symbol of the distance of movement of the lens assembly is converted.

Although the second embodiment of the present invention shown in and described with reference to FIGS. 11 and 12 employs the increased number of the control steps, it is advantageous in that any possible defect resulting from the change in load can accurately be eliminated.

Figure 13:
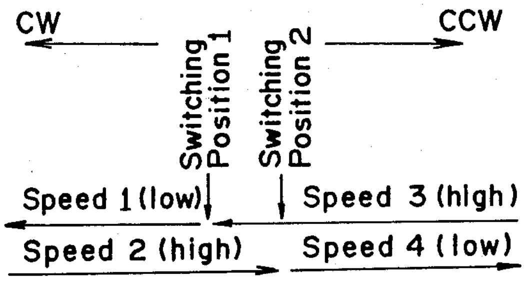
Figure 14:
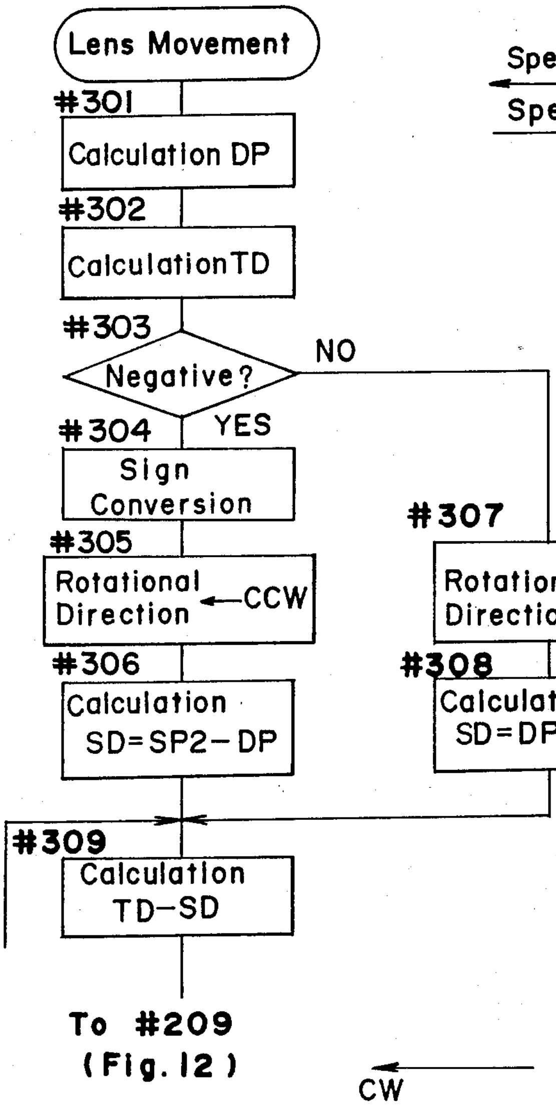

FIGS. 13 and 14 illustrate a third embodiment of the present invention wherein different switching positions are employed depending on the direction in which the lens assembly 26 is moved. In this instance, a subroutine, shown in FIG. 14, to be executed at step #11 shown in FIG. 9 differs from that shown in FIG. 12 in that, instead of step #203 shown in FIG. 12, steps #306 and #308 are newly employed in the subroutine of FIG. 14. It is to be noted that step #309 in the subroutine of FIG. 14 is continued to step #210 shown in FIG. 12. In other words, while in the subroutine of FIG. 12 the switching distance is calculated only at step #203, the switching distance is calculated at two steps #306 and #308 according to the direction (CCW or CW) of movement of the lens assembly 26.

Namely, at step #306, the difference between the switching position SP2 and the desired lens position DP is calculated, and the difference between the desired lens position DP and the switching position SP1 is calculated at step #308. These calculations are made in consideration of a symbol of the value.

Figure 15:
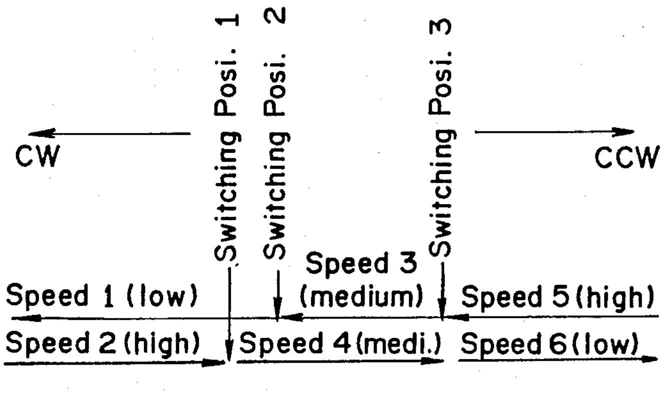
Figures 16, 16A:
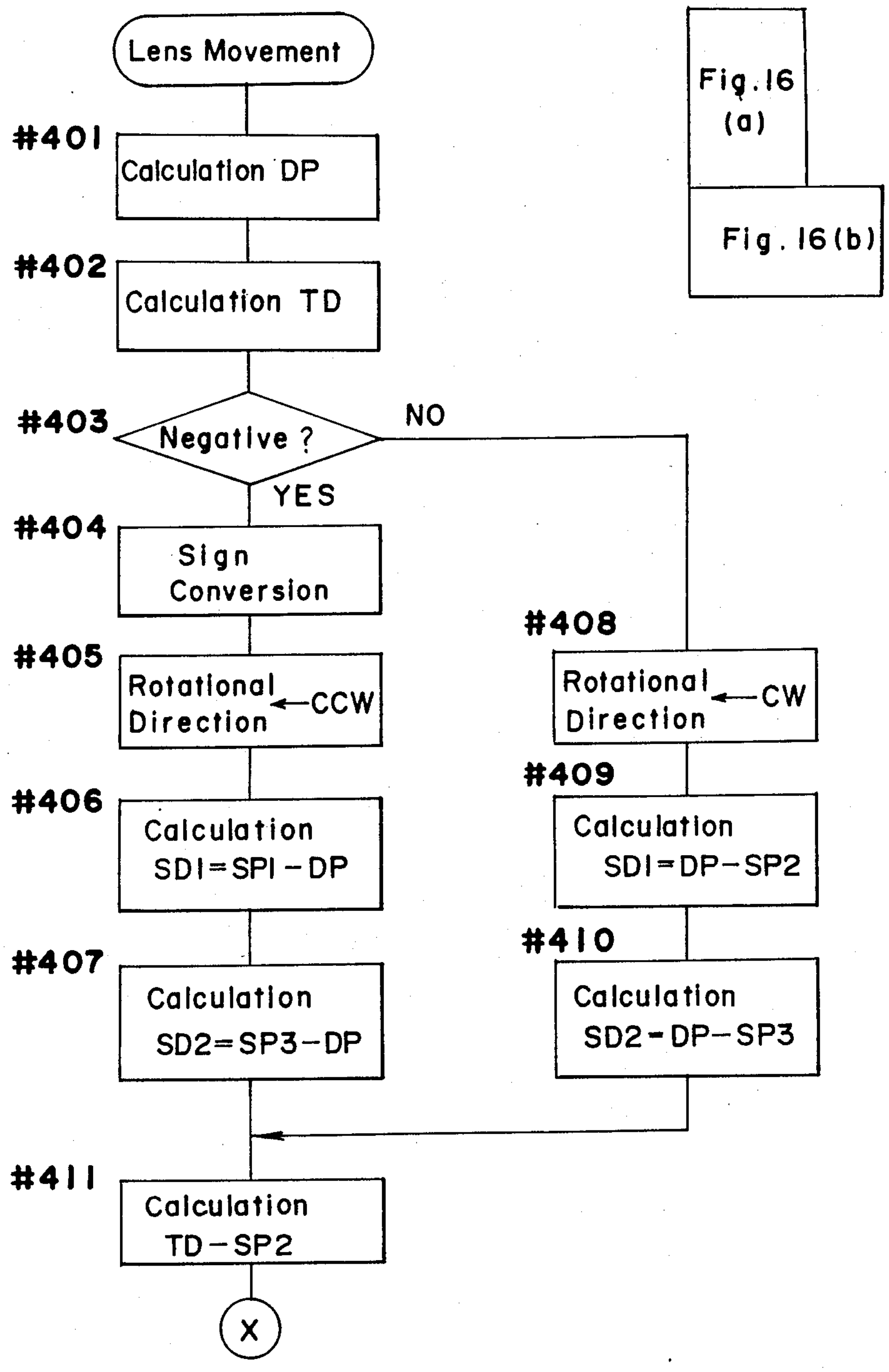

FIGS. 15 and 16 illustrate a fourth embodiment of the present invention in which a plurality of switching positions, for example, the switching positions SP1, SP2 and SP3, are employed and, at the same time, arrangement has been made to allow the lens assembly 26 to be moved at one of speeds 1 (low speed), 3 (medium speed) and 5 (high speed) during the movement thereof in the enlarging direction CW and to be driven at one of speeds 2 (high speed), 4 (medium speed) and 6 (low speed). This fourth embodiment is specifically designed to accomplish a high speed switching of the speed at which the stepper motor 1 is rotated and also to enable the employment of a compact motor for the stepper motor.

A subroutine shown in FIG. 16 used to effect the movement of the lens assembly is similar to the subroutine of FIG. 12, except that, instead of step #203 shown in FIG. 12, steps #406, #407, #409 and #410 are newly employed and that step #209 shown in FIG. 12 is divided into two steps #411 and #413, accompanied by the employment of steps #412, #414, #415, . . . #422, and #423 equal in number to the number of the speeds at which the stepper motor 1 can be rotated. It is to be noted that any one of the steps #418 to #423 is followed by step #217 shown in FIG. 12. By the provision of the newly added step #406 and such other steps as described above, the difference between the distance over which the lens assembly is moved and any one of the switching distances SD1 and SD2 is determined each time so that one of the speeds 1 to 6 can be selected for the stepper motor 1.

In the foregoing embodiments, a cause for the change in load on the stepping motor has been described as residing in that the lens assembly moves along the curved path delimited by the cam face 31 as necessitated in the copying machine employing the corner-to-corner alignment method of document placement. However, the change in load on the stepper motor is often brought about by some other causes, and the embodiments of the present invention which will be described subsequently are specifically designed to counteract with the change in load brought about by some other causes.

Figure 17:
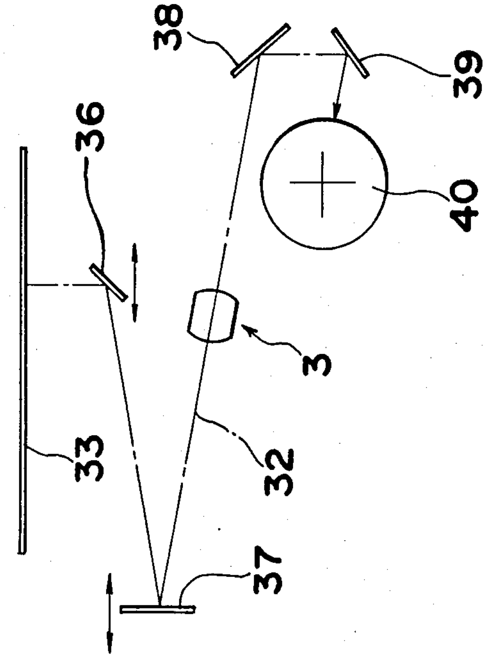
FIG. 17 is a schematic representation of an optical system used in a copying machine, according to a fifth embodiment of the present invention.
Figure 16B:
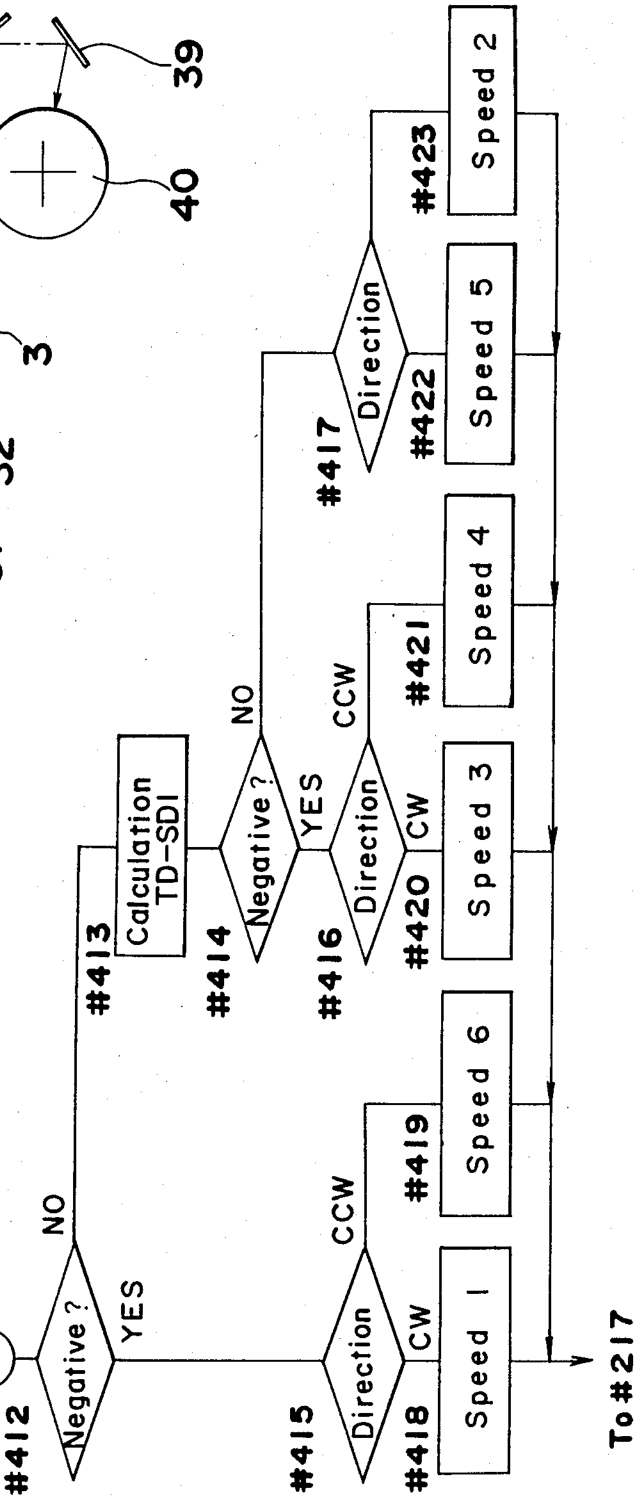

FIG. 17 illustrates a fifth embodiment of the present invention wherein the lens unit 3 is inclined. The system wherein the lens unit 3 is inclined is employed not only in the copying machine employing the corner-to-corner alignment method of document placement, but also in a copying machine employing a center-to-center alignment method of document placement. In this embodiment, since the lens unit 3 is inclined, the load on the stepper motor 1 varies depending on whether the lens assembly is moved in the reducing direction or whether it is moved in the enlarging direction.

In FIG. 17, reference numerals 36, 37, 38 and 39 represent first, second, third and fourth mirrors, respectively, while reference numeral 40 represents a photoreceptor drum. It is to be noted that the first and second mirrors 36 and 37 are movably supported.

Figure 18:
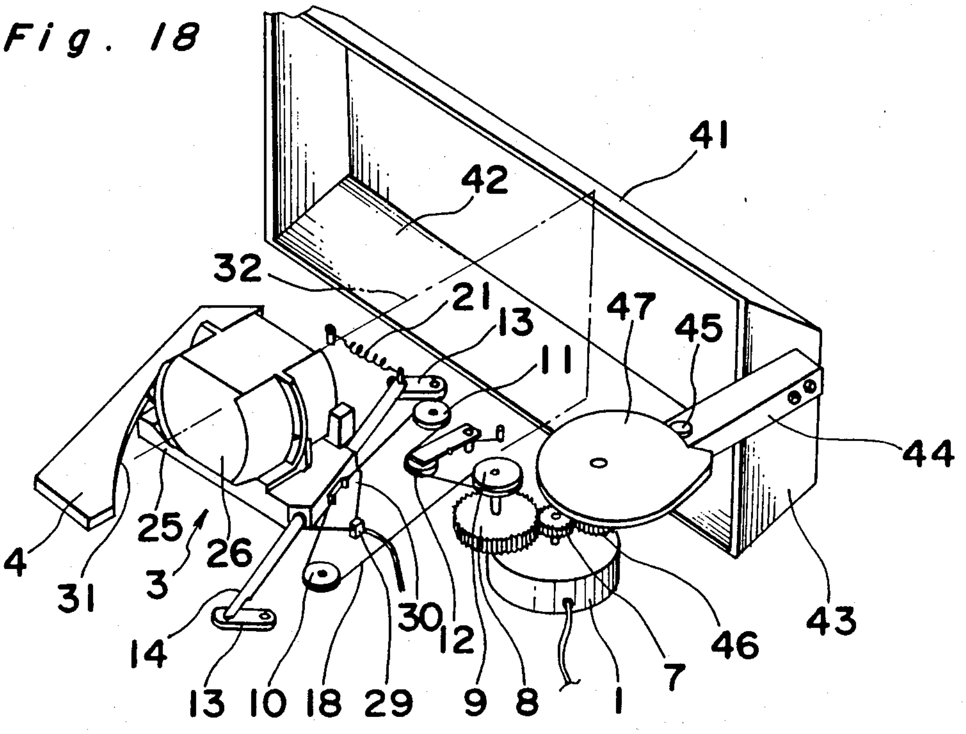
FIGS. 18, 19 and 20 are schematic perspective views showing sixth, seventh and eight embodiments of the present invention, respectively.

Shown in FIG. 18 is a sixth embodiment of the present invention. The copying machine shown therein is of a type wherein a mirror position is changed for changing the conjugate length according to the choice of one of the magnifications. So far shown, third and fourth mirrors 41 and 42, which correspond respectively to the third and fourth mirrors 38 and 39 shown in FIG. 17, are adapted to be driven by the stepper motor 1 which is used for moving the lens assembly. For this purpose, the third and fourth mirrors 41 and 42 are mounted on a mirror holder 43 which has an arm 44 rigidly secured thereto. The free end of the arm 44 remote from the mirror holder 43 has mounted thereon a roller element 45 slidingly engaged with the shaped peripheral edge of a compensating cam plate 47 used to compensate for change in conjugate length. This cam plate 47 is rigidly mounted on a shaft for rotation together with the third gear 46 which is in turn meshed with the first gear 7 fast with the drive shaft of the stepper motor 1 so that, when the stepper motor 1 is rotated, the compensating cam plate 47 can be rotated with the shaped peripheral edge thereof causing the mirror holder 43 and, hence, the third and fourth mirrors 41 and 42, to move while said peripheral edge of the cam plate 47 is constantly slidingly engaged with the roller 45. Thus, it will readily be seen that the movement of the mirror holder 43 takes place simultaneously with the movement of the lens assembly 26.

The conjugate length is minimal when and so long as the lens assembly 26 is held at the equal size reproduction position, but increases with increase or decrease of the magnification, i.e., when the lens assembly 26 is moved in either the enlarging direction or the reducing direction. When the stepper motor 1 for the drive of the lens assembly 26 is concurrently used for the compensation for change in conjugate length such as shown in FIG. 18, changes in load arising when the mirror holder 43 is driven bring about an adverse effect on the stepper motor 1 in a manner similar to that described hereinbefore. However, if the speed of the stepper motor is controlled in dependence on the change in load in the manner as hereinbefore described in connection with the first preferred embodiment or other embodiments, the adverse effect which will be brought about by the change in load can be eliminated.

Figure 19:
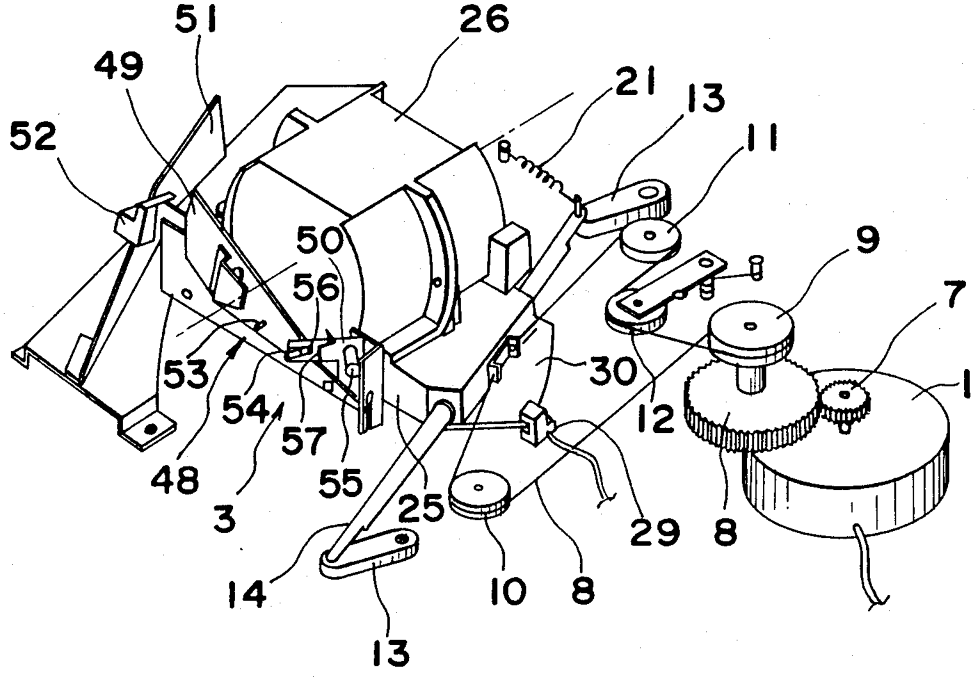

Referring now to FIG. 19, there is shown a seventh embodiment of the present invention. In this embodiment, a light amount compensating device 48 is provided on the lens carriage 25 for achieving an automatic compensation for change in pattern of distribution of light amounts incident to the movement of the lens assembly necessitated by the change of magnification. This device 48 comprises first and second light amount compensator plates 49 and 50 and a light amount compensator cam 51. The first plate 49 is pivotally mounted on a first pin 53, rigidly secured to the lens carriage 25, and is provided with a holder 52 capable of rolling on the compensator cam 51 and a second pin 54 secured on one side of the first plate 49 remote from the other side securing holder 52 thereon.

On the other hand, the second plate 50 is pivotally supported by a third pin 55 rigidly secured to the lens carriage 25, and has defined therein a slot 56 in which the second pin 54 is slidingly engaged. A coiled torsion spring 57 is interposed between the second plate 50 and the lens carriage 25 for upwardly urging the second plate 50 and the first plate 49 through the slot 56 and the second pin 54 thereby allowing the holder 52 to be held in abutment with the compensator cam 51.

In this construction, as the lens assembly is moved, the first plate 49 is caused to pivot about the first pin 53 by the compensator cam 51 engaged with the holder 52, which is accompanied by the pivotal movement of the second plate 50 about the third pin 55 so that the pattern of distribution of the light amount of light, which has passed through the lens assembly 26, in a direction lengthwise of a slit can be rendered uniform.

Even in the seventh embodiment, since the compensating device 48 is required to be driven together with the lens assembly, the change in load occurs. However, this problem can be eliminated by controlling the speed of the stepper motor 1 in a manner as hereinbefore described in connection with the first preferred embodiment.

It is to be noted that the method of controlling the stepper motor 1 described in connection with any one of the first to fourth embodiments of the present invention can equally be applicable to any one of the fifth to seventh embodiments.

Figure 20:
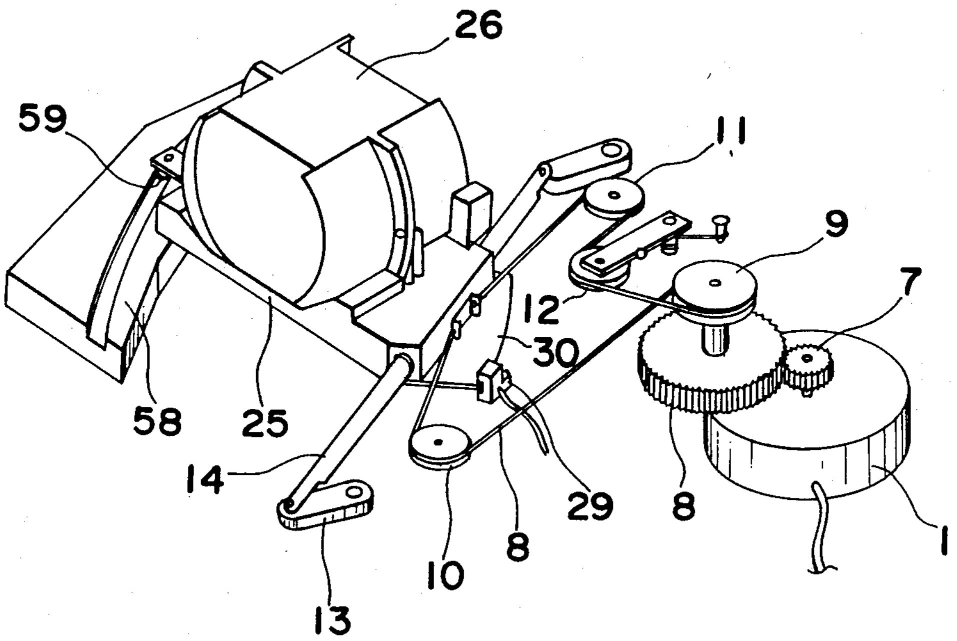

The eighth embodiment of the present invention is shown in FIG. 20, in which, instead of the combination of the cam plate 4 with the roller 28 both employed in the embodiment shown in and described with reference to FIG. 1, one type of positive motion cam is employed which comprises a cam 58 in the form of a grooved cam in combination with a roller 59 secured to the lens carriage 25 and rollingly engaged in the cam groove defined in the cam 58. The employment of the positive motion cam in the embodiment shown in FIG. 20 renders the use of the coil spring 21, employed in the first embodiment as shown in FIG. 1, to be no longer necessary.

Figure 21:
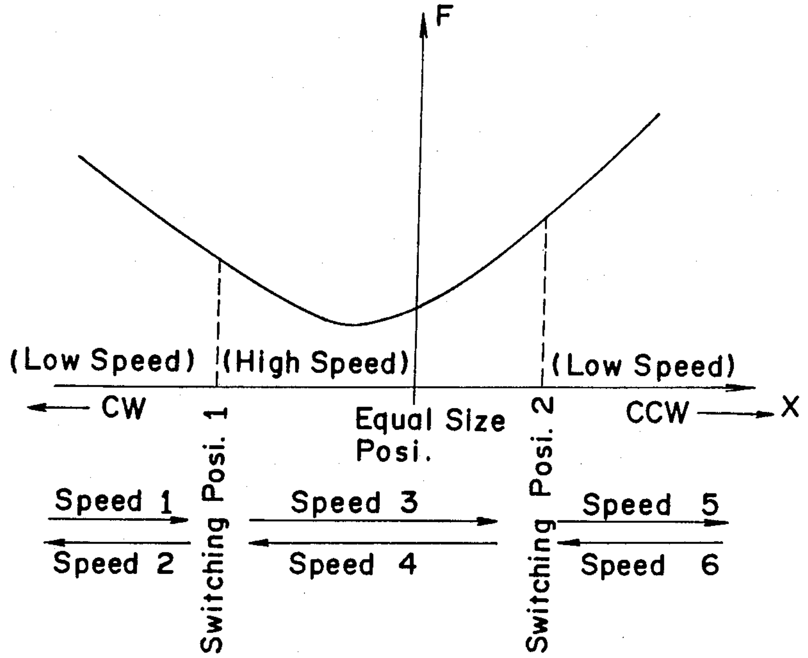
FIG. 21 is a schematic graph showing changes in load on the stepper motor used in the eighth embodiment of the present invention.

In the construction shown in FIG. 20, the load F on the stepper motor 1 is minimal when and so long as the lens assembly 26 is held generally at the equal size reproduction position, but tends to increase when it is moved in either the enlarging direction CW or the reducing direction CCW, as shown in FIG. 21. Therefore, arrangement is made that a position intermediate of the path of travel of the lens assembly in the enlarging direction and that in the reducing direction are taken as first and second switching positions SP1 and SP2 and, by taking this as a boundary, the speed of the motor 1 is so controlled as to shift from high speed 3 and 4 down to any one of low speeds 1, 2, 5 and 6, and vice versa.

From the foregoing description, it has now become clear that the stepper motor is controlled to rotate at a high speed and a low speed when the load thereon is small and great, respectively. Accordingly, not only can any possible quivering motion of the stepper motor at the low load be eliminated, but also both the reduction in time required to move the lens assembly from one position to another according to the choice of magnifications and the prevention of any possible disorder at the high load can advantageously be achieved. This in turn results in such an additional advantage that a high torque motor need not be used and the drive system can be manufactured in a compact size and at reduced cost.

Although the present invention has been fully described in connection with the numerous preferred embodiments with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An optical member drive system for a copying machine or the like including a projector lens assembly movable along a predetermined path, which system comprises:

a drive unit for moving the lens assembly;

means for, when the lens assembly is moved along the predetermined path which is divided into a predetermined number of zones, setting a speed at any one of the zones to a value appropriate to the magnitude of a load acting on the drive unit; and means for speed-controlling the drive unit in accordance with the speed set by said setting means.

2. A system as claimed in claim 1, further comprising a lens position detecting means disposed on the predetermined path, a lens position signal which is detected by said detecting means being applied to the setting means for the determination of one of the zones in which the lens assembly is located.

3. A system as claimed in claim 2, wherein said detecting means comprises a sensor member, and said drive unit is a stepper motor and wherein the current position of the lens assembly is determined by a reference position detected by the sensor member and the number of pulses required for the lens assembly to move from the reference position to the current position.

4. A system as claimed in claim 1, wherein said predetermined path is delimited by a curved cam.

5. A system as claimed in claim 1, wherein said predetermined path lies in an inclined plane.

6. A system as claimed in claim 1, wherein said drive unit provides a drive not only to the lens assembly, but also to other members.

7. An optical member drive system for a copying machine or the like including a projector lens assembly movable along a predetermined path, which system comprises:

a drive unit for moving the lens assembly;

a first means for determining a current position of the lens assembly;

a second means for determining the direction in which the lens assembly has to be moved;

a storage means for storing speeds of movement of the lens assembly in respective zones of the predetermined path which is divided into such zones; and a control means for controlling the drive unit so as to cause the lens assembly to be moved at one of the speeds, which is assigned to the zone of the current position, in a direction determined by the second means.

8. A system as claimed in claim 7, wherein the storage means stores the zones of the predetermined path in both forward and rearward directions of movement of the lens assembly and, also, the speeds assigned to the respective zones.

9. A system as claimed in claim 8, wherein the interval between each neighboring zones in the forward direction is different from that in the rearward direction.

10. A system as claimed in claim 7, wherein the first means includes a lens position detecting member and a calculating means for calculating the current position of the lens assembly in reference to a reference position of the lens assembly, detected by a lens position detecting means, and the distance of movement of the lens assembly from the reference position.

11. A system as claimed in claim 7, wherein said predetermined path is delimited by a cuurved cam.

12. A system as claimed in claim 7, wherein said predetermined path lies in an inclined plane.

13. A system as claimed in claim 7, wherein said drive unit provides a drive not only to the lens assembly, but also to other members.

14. An optical drive system for a copying machine or the like including an optical member movable along a predetermined path, which system comprises:

a drive unit for moving the lens assembly;

means for, when the lens assembly is moved along the predetermined path which is divided into a predetermined number of zones, setting a speed at any one of the zones to a value appropriate to the magnitude of a load acting on the drive unit; and means for speed-controlling the drive unit in accordance with the speed set by said setting means.

15. A system as claimed in claim 14, further comprising an optical member position detecting means disposed on the predetermined path, an optical member position signal which is detected by said detecting means being applied to the setting means for the determination of one of the zones in which the optical member is located.

16. A system as claimed in claim 15, wherein said detecting means comprises a sensor member, and said drive unit is a stepper motor and wherein the current position of the optical member is determined by a reference position detected by the sensor member and the number of pulses required for the optical member to move from the reference position to the current position.

17. A system as claimed in claim 14, wherein said predetermined path is delimited by a curved cam.

18. A system as claimed in claim 14, wherein said predetermined path lies in an inclined plane.

19. A system as claimed in claim 14, wherein said drive unit provides a drive not only to the optical member, but also to other members.

20. A system as claimed in claim 14, wherein said optical member is a projector lens member for projecting an image of an original to a photosensitive medium.

* * * * *